United States Patent
Barillaud

(10) Patent No.: US 6,741,568 B1
(45) Date of Patent: May 25, 2004

(54) USE OF ADAPTIVE RESONANCE THEORY (ART) NEURAL NETWORKS TO COMPUTE BOTTLENECK LINK SPEED IN HETEROGENEOUS NETWORKING ENVIRONMENTS

(75) Inventor: Franck Barillaud, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/465,182

(22) Filed: Dec. 15, 1999

(51) Int. Cl.7 ............................................. G01R 31/08
(52) U.S. Cl. .................. 370/252; 370/232; 706/15; 706/16
(58) Field of Search .................. 370/252, 253, 370/254, 464, 465, 255, 467, 401, 460, 410, 402; 706/15, 16, 25; 709/223, 224, 235; 455/67.6

(56) References Cited

U.S. PATENT DOCUMENTS

| | | |
|---|---|---|
| 5,606,664 A | 2/1997 | Brown et al. |
| 5,684,796 A | 11/1997 | Abidi et al. |
| 5,710,885 A | 1/1998 | Bondi |
| 5,727,157 A | 3/1998 | Orr et al. |
| 5,751,964 A | 5/1998 | Ordanic et al. |
| 5,822,535 A | 10/1998 | Takase et al. |
| 5,845,277 A | 12/1998 | Pfeil et al. |
| 5,848,243 A | 12/1998 | Kulkarni et al. |
| 5,864,862 A | 1/1999 | Kriens et al. |
| 6,125,105 A * | 9/2000 | Edwards ........................ 370/230 |
| 6,209,033 B1 * | 3/2001 | Datta ............ 709/224 |
| 6,215,774 B1 * | 4/2001 | Knauerhase ................. 370/252 |
| 6,216,163 B1 * | 4/2001 | Bharali ......................... 709/227 |
| 6,260,072 B1 * | 7/2001 | Rodriguez-Moral ........ 709/241 |

OTHER PUBLICATIONS

The Incremental deployability of RTT–based congestion avoidance for high speed TCP Internet connections, Sigmetrics 2000, Santa Clara, Ca.*

Traffic Measurement and Analysis, kenjiro Cho, Sony 2002.*

U.S. patent application Ser. No. 09/465,181, Anstey et al., filed Dec. 15, 1999.

U.S. patent application Ser. No. 09/465,183, Barillaud, filed Dec. 15, 1999.

(List continued on next page.)

Primary Examiner—Douglas Olms
Assistant Examiner—Ricardo M. Pizarro
(74) Attorney, Agent, or Firm—Marilyn Smith Dawkins; Bracewell & Patterson, L.L.P.

(57) ABSTRACT

Bottleneck link speed, or the transmission speed of the slowest link within a path between two nodes, is determining by transmitting a sequence of ICMP ECHO data packets from the source node to the target node at a selected interval and measuring the return data packet intervals. Rather than using statistical analysis methods, the return data packet interval measurements are input into an adaptive resonance theory neural network trained with the expected interval for every known, existing network transmission speed. The neural network will then classify the return data packet interval measurements, indicating the bottleneck link speed. Since most of the computation—that required to train the neural network—may be performed before the data packet interval measurements are made rather than after, the bottleneck link speed may be determined from the return data packet interval measurements significantly faster and using less computational resources than with statistical analysis techniques. Moreover, fewer measurements are required to determine bottleneck link speed to the same degree of accuracy.

12 Claims, 3 Drawing Sheets

OTHER PUBLICATIONS

James W. Hong, Michael A. Bauer and J. Michael Bennett, *The Role of Directory Services in Network Management*, Sep. 28, 1992, pp. 175–187.

IBM Technical Disclosure Bulletin, *Determination of Bandwidth and Latency in a Multimedia Communication Environment*, Feb. 1994, vol. 37 No. 02A, pp. 349–350.

Joonho Park, Brian W. O'krafka, Stamatis Vassiliadis and Jose Delgado–Frias, *Survey on Routers*, Apr. 1994.

IBM Technical Disclosure Bulletin, *Dynamic Determination of Network Topology*, Mar. 1995, vol. 38 No. 03, pp. 411–418.

Chung Sheng Li, Yoram Ofek and Moti Yung, *"Time–Driven Priority" Flow Control for Real–Time Heterogeneous Internetworking*, Aug. 3, 1995.

* cited by examiner

USE OF ADAPTIVE RESONANCE THEORY (ART) NEURAL NETWORKS TO COMPUTE BOTTLENECK LINK SPEED IN HETEROGENEOUS NETWORKING ENVIRONMENTS

RELATED APPLICATIONS

The present invention is related to the subject matter of commonly assigned, copending U.S. patent applications; Ser. No. 09/465,181; and Ser. No. 09/465,183. The content of the above-identified applications are incorporated herein by reference.

BACKGROUND OF THE INVENTION

1. Technical Field

The present invention generally relates to characterizing communications between data processing systems and in particular to determining bottleneck link speed between data processing systems. Still more particularly, the present invention relates to employing adaptive resonance theory neural networks to determine bottleneck link speed between data processing systems with minimal sampling.

2. Description of the Related Art

Computer networks are essential features of contemporary computing, providing the framework for exchange of data and execution of distributed applications, either through client-server interaction such as HyperText Transmission Protocol clients and servers or collaborative operation such as failover redundancy in highly available networks. In contemporary networking environments, most customers have a need to control the use of existing bandwidth so that network management traffic is not competing with the business traffic.

Because some critical distribution tasks must be performed under certain constraints (e.g., download of new anti-virus software as quickly as possible or updating a data processing tool during non-business hours), knowledge of the speed of the physical link between different locations is critical to performing the tasks in an optimum manner. Knowledge of the bottleneck link speed, which represents the slowest link speed between two network entities, is therefore crucial in the sense that it will have a dramatic impact on the overall distribution process.

Currently there are two different techniques for obtaining the bottleneck link speed between two network entities. The first is to obtain a physical network topology, with all of the information on each of the links forming a part of the topology. The second is to compute the bottleneck link speed in an independent manner, preferably without the prerequisite of additional, expensive software. For transmission control protocol/Internet protocol (TCP/IP) environments, the most commonly employed method of independently computing bottleneck link speed is to send a sequence of ICMP ECHO packets from the source to the target and measure the inter-arrival times of the returning packets.

Because conditions are never ideal, and also due to the unstable nature of heterogenous networking environments, the independently measured bottleneck link speed value is never accurate when computed from only one sample. To obtain an accurate estimate of bottleneck link speed, multiple samples (typically hundreds, since accuracy is proportional to the number of samples collected) must be obtained and statistically processed. Different sized data packets transmitted at different intervals are employed, and the interval of the return data packets is compared to the transmission interval and analyzed—for example, through filtering and/or ordering or in a histogram—to determine the bottleneck link speed. However, these processes are extremely time consuming and computationally intensive.

It would be desirable, therefore, to provide a technique for quickly and accurately determining bottleneck link speed between two network entities. It would further be advantageous to be able to determine bottleneck link speed from a minimal number of data packet return interval measurements.

SUMMARY OF THE INVENTION

It is therefore one object of the present invention to provide an improved method, system and computer program product for characterizing communications between data processing systems.

It is another object of the present invention to provide an improved method, system and computer program product for determining bottleneck link speed between data processing systems.

It is yet another object of the present invention to employ adaptive resonance theory neural networks to determine bottleneck link speed between data processing systems with minimal sampling.

The foregoing objects are achieved as is now described. Bottleneck link speed, or the transmission speed of the slowest link within a path between two nodes, is determining by transmitting a sequence of ICMP ECHO data packets from the source node to the target node at a selected interval and measuring the return data packet intervals. Rather than using statistical analysis methods, the return data packet interval measurements are input into an adaptive resonance theory neural network trained with the expected interval for every known, existing network transmission speed. The neural network will then classify the return data packet interval measurements, indicating the bottleneck link speed. Since most of the computation—that required to train the neural network—may be performed before the data packet interval measurements are made rather than after, the bottleneck link speed may be determined from the return data packet interval measurements significantly faster and using less computational resources than with statistical analysis techniques. Moreover, fewer measurements are required to determine bottleneck link speed to the same degree of accuracy.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
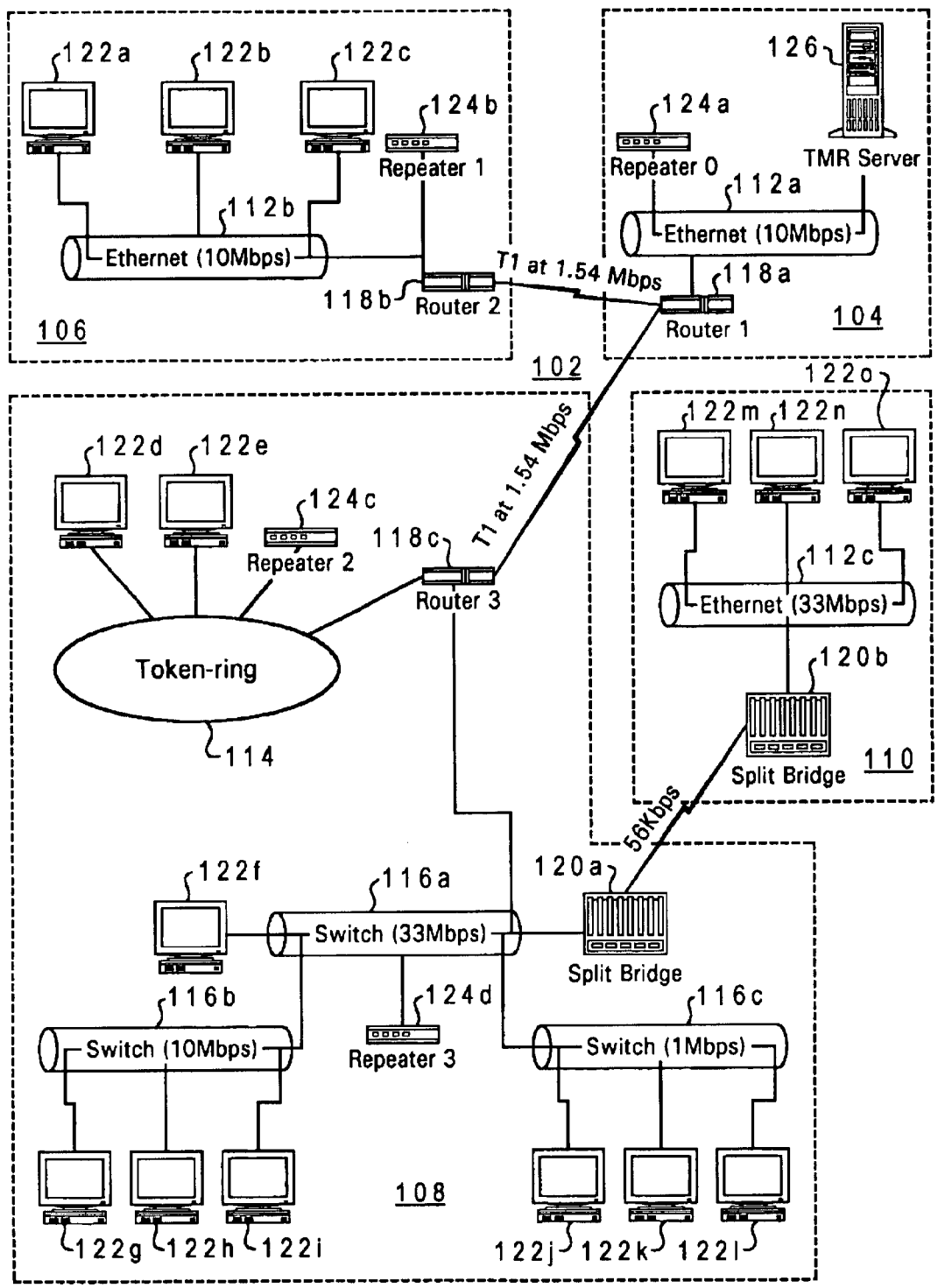
FIG. 1 depicts a data processing system network in which a preferred embodiment of the present invention may be implemented.

With reference now to the figures, and in particular with reference to FIG. 1, a data processing system network in which a preferred embodiment of the present invention may be implemented is depicted. Data processing system network 102 is a wide area network (WAN) or global area network (GAN) including a number of constituent local area networks (LANs) 104, 106, 108, and 110. In the exemplary embodiment, LAN 104 is located, for example, in Dallas, Tex., LAN 106 is located in Austin, Tex., LAN 108 is located in Raleigh, N.C., and LAN 110 is located in Durham, N.C.

Data processing system network 102 is heterogenous, meaning that each component network 104, 106, 108, and 110 may employ a different "backbone" or communications protocol, and that communications between component networks 104, 106, 108, and 110 may utilize different forms and devices. In the exemplary embodiment, for instance, LANs 104, 106, and 110 each employ an Ethernet backbone 112a–112c, although with differing maximum data throughput rates, while LAN 108 employs both token ring and switched communications protocols 114 and 116a–116c, respectively. Additionally, LAN 104 communicates with LANs 106 and 108 utilizing routers 118a–118c, while LAN 108 communicates with LAN 110 utilizing a split bridge 120a–120b.

Executing within each of the data processing systems 122a through 122o in data processing system network 102 may be a distributed computing environment and/or application (not shown), such as Tivoli Global Enterprise Manager (GEM) available from Tivoli Systems (www.tivoli.com). Such a distributed computing environment or application may provide enterprise asset management, network change (e.g., software updates) management, operations management, security and storage management, etc. A distributed computing environment and/or application of the type described requires information about communications speed, particularly bottleneck link speed, between constituent components in order to perform tasks in an efficient manner.

Figure 2:
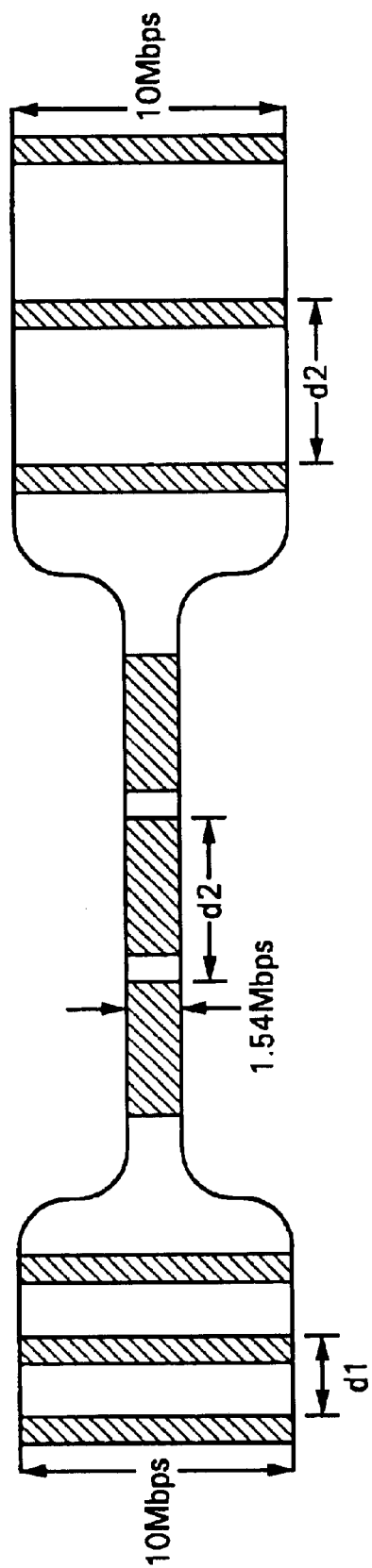
FIG. 2 is a diagram of a technique for determining bottleneck link speed employed in a preferred embodiment of the present invention.

Referring to FIG. 2, which is intended to be read in conjunction with FIG. 1, a diagram of a technique for determining bottleneck link speed employed in a preferred embodiment of the present invention is illustrated. In order to characterize communications between nodes of network 102, and in particular to determine the bottleneck link speed between two nodes, a known packet timing technique is employed. In transmission control protocol/Internet Protocol (TCP/IP) architectures, bottleneck link speed is typically measured by sending a sequence of inter-control message protocol (ICMP) ECHO packets from the source to the target and measuring the inter-arrival times of the returning packets. ICMP forms part of the TCP/IP stack, and ICMP ECHO packets are typically small packets (on the order of 64 bytes) which are returned by the target to their source at the same speed at which they are received.

ICMP ECHO packets, illustrated as cross-hatched blocks in FIG. 2, may be sent on a transmission medium having a known transmission speed at a selected interval. For instance, in determining the bottleneck link speed between server 126 and workstation 122a, a series of ICMP ECHO packets may be transmitted by server 126 on LAN 112a (operating at 10 Mbps in the depicted example) at 1 millisecond intervals, targeting workstation 122a. The packets will then be transmitted across the T1 connection between routers 118a and 118b (operation at 1.54 Mbps in the depicted example) to LAN 112b, and across LAN 112b to workstation 122a.

Data packets initially transmitted at 1 ms intervals on a high bandwidth network will not maintain that interval when passed across a lower bandwidth media. In the example shown, the ICMP ECHO data packets are initially transmitted on a 10 Mbps network at a defined interval (d1, or 1 ms in the example described). A lower bandwidth media will not be able to pass the data packets at the same interval, so that the interval or gap (d2) between data packets will increase in proportion to the relative speed of the link. In passing from a lower bandwidth media to a higher bandwidth media, the interval d2 between data packets will remain constant since the higher bandwidth media will retransmit the packets at the same speed at which they are received. On the return trip, the interval d2 between packets, reflecting the lowest speed media in the path, will remain constant. Thus, by measuring the inter-arrival times of return packets, the speed of the slowest link (the "bottleneck link") within the path between two network work nodes may be determined.

Figure 3:
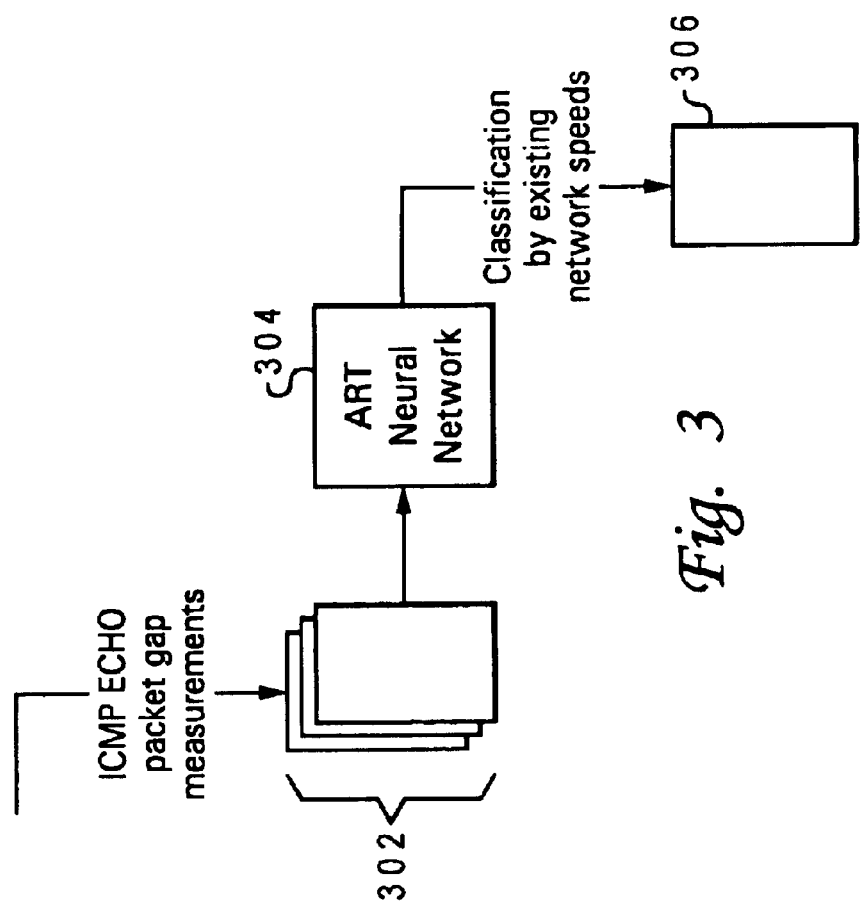
FIG. 3 depicts a block diagram of a mechanism for determining bottleneck link speed from data packet interval measurements in accordance with a preferred embodiment of the present invention.

With reference now to FIG. 3, a block diagram of a mechanism for determining bottleneck link speed from data packet interval measurements in accordance with a preferred embodiment of the present invention is depicted. As noted above, a single data packet interval measurement is insufficient in the prior art to determine the bottleneck link speed within an acceptable accuracy for the statistical methods employed. In the present invention, however, rather than utilizing statistical methods to analyze the data packet interval measurements 302, a generic classifier such as a neural network is employed, preferably an adaptive resonance theory (ART) or self organizing feature map (SOFM) neural network 304.

ART neural networks are known in the art and available from several sources. ART neural networks are defined algorithmically in terms of detailed differential equations intended as plausible models of biological neurons. In practice, ART neural networks are implemented using analytical solutions or approximations to the differential equations. ART neural networks may be supervised or unsupervised, where unsupervised ART neural networks are basically similar to many iterative clustering algorithms in which each case is processed by finding the "nearest" cluster seed (i.e., prototype or template) to that case, then updating that cluster seed to be "closer" to the subject case, where "nearest" and "closer" may be defined in a variety of different manners.

In ART neural networks, however, this framework is slightly modified by introducing the concept of "resonance", so that each case is processed by finding the "nearest" cluster seed which "resonates" with that case, then updating that cluster seed to be "closer" to the subject case. The term "resonance" refers to the so called resonant state of the neural network in which a category prototype vector matches the current input vector close enough so the orienting subsystem will not generate a reset signal. In this case, the activity pattern causes the same node to be selected, which in turn sends the same prototype vector, which again matches the current input close enough, and so on. The neural network learns only in its resonant state. ART neural networks are capable of developing stable clusterings of arbitrary sequences of input patterns by self-organization. In general, the output of an ART neural network would be of the form:

| Node | Class |
|------|-------|
| A | 1 |
| B | 1 |
| C | 2 |
| D | 2 |
| E | 3 |
| F | 1 |
| G | 3 |
| H | 4 |

These results indicate that nodes A, B and F belong to the same class, nodes C and D belong to a different class, and nodes E and G belong to a third class, while node H belongs to its own class. With the context of the present invention, the different classes may be interpreted as representing different well-known, existing network speeds. The ART neural network 304 thus correlates data packet interval measurements for returning ICMP ECHO data packets with expected intervals corresponding to known, existing network speeds, and may accurately do so with as few as one measurement.

With the statistical analysis methods of the prior art, extensive computing is required after each sequence of return data packet interval measurements. With the present invention, however, the neural network may be trained before the return data packet interval measurements are made. The measurements are then input into the neural network to determine the bottleneck link speed. The time required to determine bottleneck link speed from a sequence of measurements is reduced, as most of the processing may be performed before any measurements are made. Additionally, a substantially smaller set of measurements will suffice to accurately determine bottleneck link speed due to the resonant quality of the neural network. The neural network is trained for every known network speed by the manufacturer, utilizing the expected return data packet intervals as a template for the known network speeds, before the software which will employ the present invention is distributed.

Figure 4:
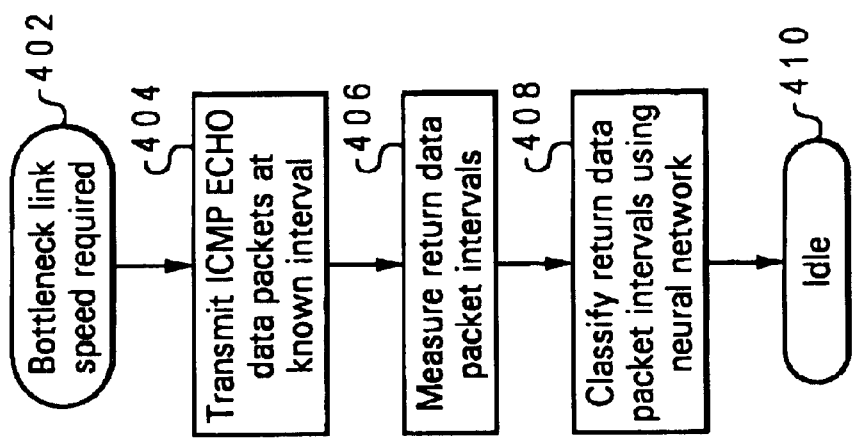
FIG. 4 is a high level flowchart for a process of determining bottleneck link speed in accordance with a preferred embodiment of the present invention.

Referring to FIG. 4, a high level flowchart for a process of determining bottleneck link speed in accordance with a preferred embodiment of the present invention is illustrated. The process begins at step 402, which depicts a bottleneck link speed between two network nodes being required. The process first passes to step 404, which illustrates transmitting a sequence of ICMP ECHO data packets from one of the network nodes to the other at a predetermined interval. The process then passes to step 406, which depicts measuring the intervals between return data packets received at the original source node.

The process next passes to step 408, which illustrates classifying the measured return data packet intervals utilizing a neural network trained with the expected intervals for known, existing network transmission media speeds. The resulting classification will be the bottleneck link speed for the communications path between the source and target nodes. The process then passes to step 410, which depicts the process becoming idle until another bottleneck link speed is required.

One advantage of the present invention is that it may be employed in conjunction with a process for determining physical network topology as described in the related applications. The ART neural network employed for determining bottleneck link speed may be one of several neural network utilized to characterize the physical network topology. Additionally, because neural networks are fault tolerant, a full set of samples is not require to accurately determine bottleneck link speed.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of determining bottleneck link speed comprising:

measuring data packet intervals for data packets transmitted between two nodes within network;

classifying the measured data packet intervals using a neural network trained with expected intervals for known transmission speeds of existing transmission media based on the expected intervals;

transmitting a plurality of data packets from a source to a target, wherein each data packet instructs the target to return the data packet as the data packet when received by the target;

measuring an integral between arrival times of the return data packets transmitted from the target to the source; and transmitting the plurality of data packets at a selected interval on a first transmission media between the source and target having a known transmission speed, wherein the selected interval corresponds to a transmission interval for which the neural network is trained.

2. A method of determining bottleneck link speed, comprising:

measuring data packet intervals for data packets transmitted between two nodes within network;

classifying the measured data packet intervals using a neural network trained with expected intervals for known transmission speeds of existing transmission media based on the expected intervals;

transmitting a plurality of data packets from a source to a target, wherein each data packet instructs the target to return the data packet as the data packet when received by the target;

measuring an interval between arrival times of the return data packets transmitted from the target to the source; and transmitting the plurality of data packets across a plurality of transmission media having varying transmission speeds altering the data packet intervals.

3. A method of determining bottleneck link speed, comprising:
   measuring data packet intervals for data packets transmitted between two nodes within a network; and
   classifying the measured data packet intervals using a neural network trained with expected intervals for known transmission speeds of existing transmission media, including:
      inputting the measured data packet intervals into the neural network; and
      receiving an indication of a class to which the measured data packet intervals correlate.

4. A method of determining bottleneck link speed, comprising:
   measuring data packet intervals for data packets transmitted between two nodes within a network;
   classifying the measured data packet intervals using a neural network trained with expected intervals for known transmission speeds of existing transmission media; and
   prior to measuring the data packet intervals, training the neural network with expected intervals of return data packets for known transmission speeds of existing transmission media and a selected transmission interval on a first transmission media having a known transmission speed.

5. A system for determining bottleneck link seed comprising:
   a network including a plurality of network nodes coupled by one or more transmission media;
   means for measuring data packet intervals for data packets transmitted between two nodes within the network;
   a neural network trained with expected intervals for known transmission speeds of existing transmission media, the neural network receiving the measured data packet intervals and classifying the measured data packet intervals media based on the expected intervals;
   means for transmitting a plurality of data packets from a source to a target, wherein each data packet instructs the target to return the data packet as the data packet when received by the target;
   means for measuring an interval between arrival times of the return data packets transmitted from the target to the source; and
   means for transmitting the plurality of data packets at a selected interval on a first transmission media between the source and target having a known transmission speed, wherein the selected interval corresponds to a transmission interval for which the neural network is trained.

6. A system for determining bottleneck link speed, comprising:
   a network including a plurality of network nodes coupled by one or more transmission media;
   means for measuring data packet intervals for data packets transmitted between two nodes within the network;
   a neural network trained with expected intervals for known transmission speeds of existing transmission media, the neural network receiving the measured data packet intervals and classifying the measured data packet intervals media based on the expected intervals;
   means for transmitting a plurality of data packets from a source to a target wherein each data packet instructs the target to return the data packet as the data packet when received by the target;
   means for measuring an interval between arrival times of the return data packets transmitted from the target to the source; and
   means for transmitting the plurality of data packets across a plurality of transmission media having varying transmission speeds altering the data packet intervals.

7. A system for determining bottleneck link speed, comprising:
   a network including a plurality of network nodes coupled by one or more transmission media;
   means for measuring data packet intervals for data packets transmitted between two nodes within the network;
   a neural network trained with expected intervals for known transmission speeds of existing transmission media, the neural network receiving the measured data packet intervals and classifying the measured data packet intervals, including:
      means for inputting the measured data packet intervals into the neural network; and
      means for receiving an indication of a class to which the measured data packet intervals correlate.

8. A system for determining bottleneck link speed, comprising:
   a network including a plurality of network nodes coupled by one or more transmission media;
   means for measuring data packet intervals for data packets transmitted between two nodes within the network;
   a neural network trained with expected intervals for known transmission speeds of existing transmission media, the neural network receiving the measured data packet intervals and classifying the measured data packet intervals, including:
      means for training the neural network with expected intervals of return data packets for known transmission speeds of existing transmission media and a selected transmission interval on a first transmission media having a known transmission speed prior to measuring the data packet intervals.

9. A computer program product within a computer usable medium for determining bottleneck link speed, comprising:
   instructions for measuring data packet intervals for data packets transmitted between two network nodes;
   instructions for classifying the measured data packet intervals using a neural network trained with expected intervals for known transmission speeds of existing transmission media based on the expected intervals;
   instructions for transmitting a plurality of data packets from a source to a target, wherein each data packet instructs the target to return the data packet as the data packet when received by the target;
   instructions for measuring an interval between arrival times of the return data packets transmitted from the target to the source; and
   instructions for transmitting the plurality of data packets at a selected interval on a first transmission media between the source and target having a known transmission speed, wherein the selected interval corresponds to a transmission interval for which the neural network is trained.

10. A computer program product within a computer usable medium for determining bottleneck link speed, comprising:
   instructions for measuring data packet intervals for data packets transmitted between two network nodes;
   instructions for classifying the measured data packet intervals using a neural network trained with expected intervals for known transmission speeds of existing transmission media based on the expected intervals;

instructions for transmitting a plurality of data packets from a source to a target, wherein each data packet instructs the target to return the data packet as the data packet when received by the target;

instructions for measuring an interval between arrival times of the return data packets transmitted from the target to the source; and instructions for transmitting the plurality of data packets across a plurality of transmission media having varying transmission speeds altering the data packet intervals.

11. A computer program product within a computer usable medium for determining bottleneck link speed, comprising:

instructions for measuring data packet intervals for data packets transmitted between two network nodes;

instructions for classifying the measured data packet intervals using a neural network trained with expected intervals for known transmission speeds of existing transmission media, including:

instructions for inputting the measured data packet intervals into the neural network; and instructions for receiving an indication of a class to which the measured data packet intervals correlate.

12. A computer program product within a computer usable medium for determining bottleneck link speed, comprising:

instructions for measuring data packet intervals for data packets transmitted between two network nodes;

instructions for classifying the measured data packet intervals using a neural network trained with expected intervals for known transmission speeds of existing transmission media, including:

instructions for training the neural network with expected intervals of return data packets for known transmission speeds of existing transmission media and a selected transmission interval on a first transmission media having a known transmission speed prior to measuring the data packet intervals.

* * * * *